Patented Jan. 22, 1924.

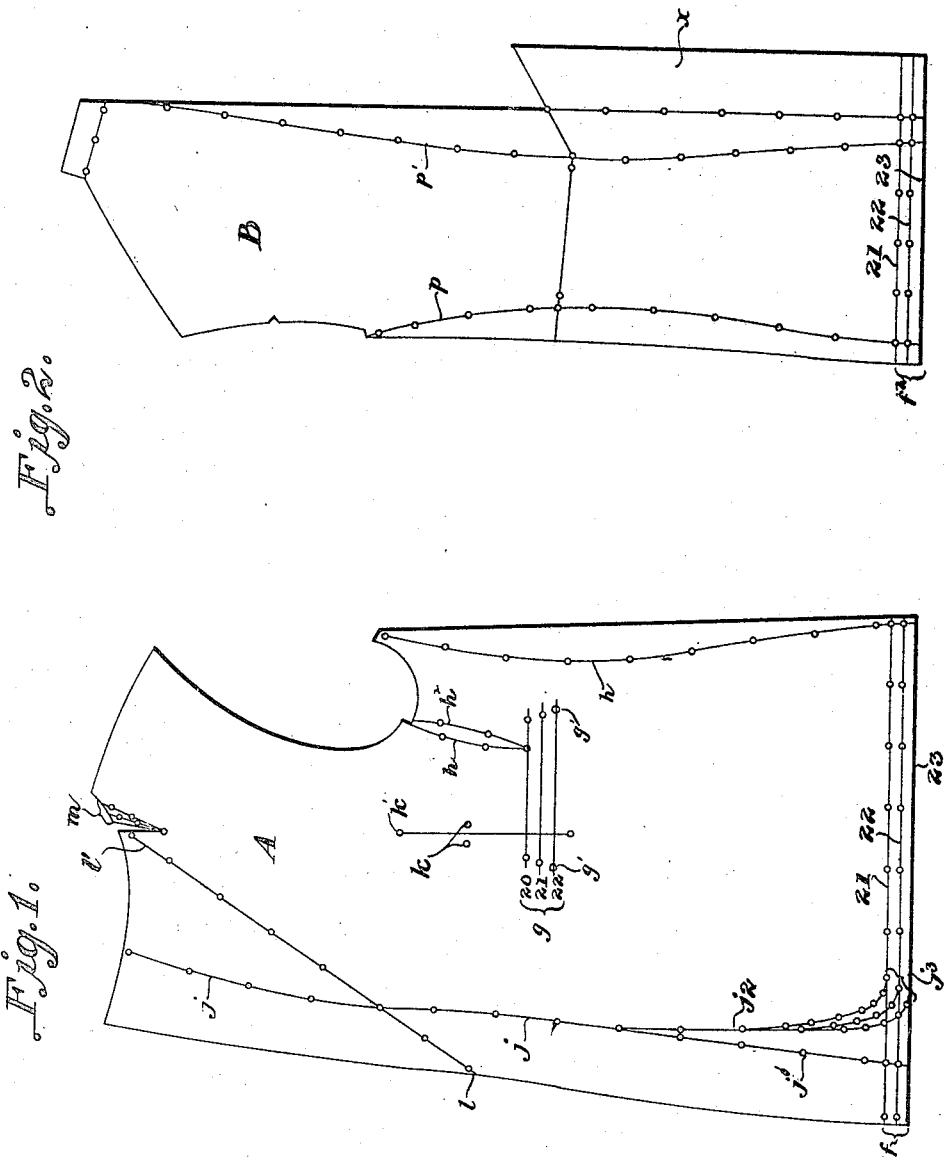

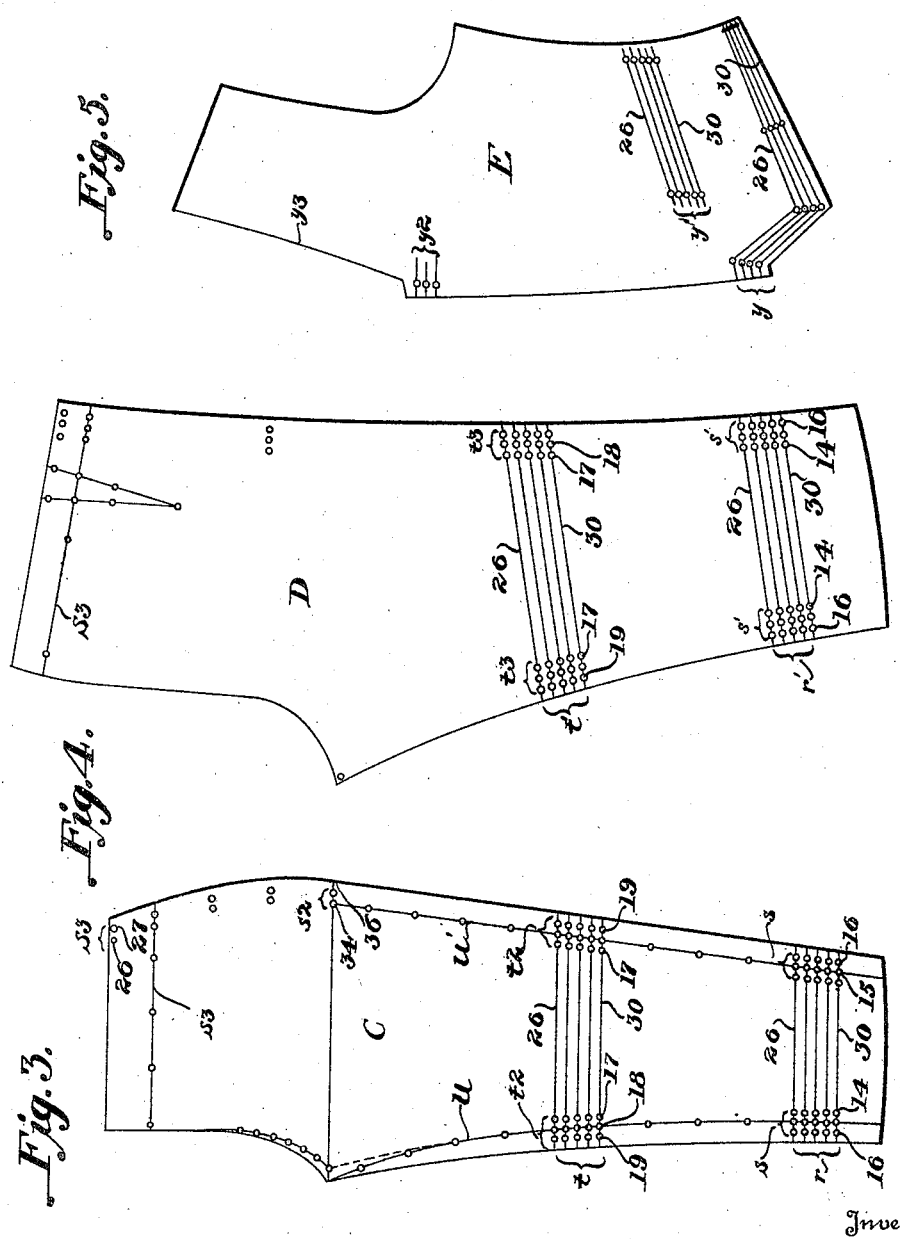

1,481,613

UNITED STATES PATENT OFFICE.

CHARLES T. MACKEY, OF CHICAGO, ILLINOIS.

CHART FOR DRAFTING GARMENTS.

Application filed May 17, 1922. Serial No. 561,776.

*To all whom it may concern:*

Be it known that I, CHARLES T. MACKEY, a citizen of United States, residing at Chicago, in the county of Cook and State of Illinois, have invented certain new and useful Improvements in Charts for Drafting Garments; and I do hereby declare the following to be a full, clear, and exact description of the invention, such as will enable others skilled in the art to which it appertains to make and use the same.

This invention relates to charts or templets for use in drafting coats, vests and trousers, and has for its object to provide a chart which can be used for drafting garments of various sizes. More particularly it is an object of the invention to provide a chart which, in addition to allowing various size garments to be drafted from a single pattern, will also provide for proper coordination between, firstly, the pockets of the coat and vest and length of said garments and secondly, the height of the knee in relation to the length of the trousers or pants.

The above and other objects and features of novelty of the invention will appear from the detailed description of the invention taken in connection with the accompanying two sheets of drawings forming part of this specification.

Referring to the drawings—

Figures 1 and 2 are charts from which the front and back parts respectively, of the coat are cut;

Figs. 3 and 4 are charts from which the front and back parts, respectively, of the trousers are cut, and Fig. 5 is the chart from which the vest is cut.

In the drawings, charts A and B illustrate, respectively, the charts from which the front and back of the coat are cut. The peripheral outline of the patterns or charts A and B will give a double-breasted box coat. At the bottom of pattern A is a scale $f$ consisting of two lines 21 and 22 parallel to the bottom edge 23, these indicating the length of the coat. Within the body of the pattern is a scale $g$ having scale lines corresponding to those of scale $f$. The scale indicates the height of the pocket corresponding to the length of the coat. At the ends of the scale lines $g$ are points $g'$ which give the proper width of the pocket for any given length of garment. Scale $f^2$ in chart B corresponds to scale $f$ in chart A.

When a double-breasted form-fitting coat is desired the pattern line $h$ is followed instead of the adjacent peripheral edge and the pattern lines $h'$, $h^2$—otherwise the general outlines of the pattern are followed. When a single-breasted form-fitting coat is desired, the said form-fitting lines are followed and also the line $j$, $j'$ if a straight front is desired or line $j$, $j^2$ if a curved front is desired. The lower end of line $j^2$ branches off into three lines forming a scale $j^3$ corresponding to scale $f$ for different length garments. In form-fitting coats the points $k$ on either side of the line $k'$ are also cut through from either end of the line.

The line $l$, $l'$ indicates the line on which the collar is creased and scale $m$ the cut of the lapels for single and double-breasted coats.

In pattern B the peripheral outlines will give the regular box coat with an open vent at $x$. Lines $p$, $p'$ will give a form-fitting coat with the open vent at $x$.

Patterns C and D indicate the front and back parts, respectively, of the trousers. Scales $r$ and $r'$ indicate the length of the trousers, scales $s$ and $s'$ indicate the width of the trousers at the bottom corresponding to the length, the numerals on the scales indicating units of measure.

The scales $t$, $t'$ locate the knee corresponding to scales $r$, $r'$ and scales $t^2$, $t^3$ indicate the proper knee widths. Scale $s^2$ indicates seat width and scale $s^3$ is for waist measure. Lines $u$ and $u'$ illustrate the pattern as laid out for trousers 15 inches wide at bottom, 18 inches wide at knee and 34 inches at seat. The use of the other markings will be obvious to those skilled in the art.

Chart E is the vest pattern. Scale $y$ indicates length of vest; $y'$ height of pockets and the dots on the lines indicate proper width of the pocket corresponding to height; scale $y^2$ indicates the points to which the line $y^3$ may be carried down.

The use of the above described patterns permits of ready cutting out of the garment material and enables a single pattern to be used for various size garments.

What I claim is:

1. A pattern of given peripheral outline, a scale at the bottom of the pattern for indicating length and width of garment, and a second scale parallelly disposed with respect to the first mentioned scale for proportionally indicating changes in garment construction, due to variation in garment length.

2. A pattern of given peripheral outline, a scale at the bottom of the pattern for indicating length and width of garment, and a second scale parallelly disposed with respect to the first mentioned scale for proportionally indicating changes in garment construction, due to variation in garment length, said scales constituting lines and markers on said lines for indicating width.

In testimony whereof I affix my signature.

CHARLES T. MACKEY.